United States Patent Office 3,235,089
Patented Feb. 15, 1966

3,235,089
COMPOSITE ADSORBENT FILTER BODY
Francis H. Burroughs, Trenton, N.J., assignor to Star Porcelain Company, Trenton, N.J., a corporation of New Jersey
No Drawing. Filed June 30, 1960, Ser. No. 39,771
19 Claims. (Cl. 210—510)

This is a continuation-in-part of my application Serial No. 668,287, filed June 27, 1957 now abandoned.

This invention relates to an improved filter body and a method of making the same, and more particularly to a desiccant filter body which is composed of particles of certain specific adsorbents bonded together by ceramic bonds.

Ceramic bonded filter bodies have been known, and are available in various pore classifications and flow rates. However, all of these known ceramic filters are dead-burned or non-activated and therefore act only as solid particle filters, i.e. they will not absorb or absorb water, or other fluids. Desiccant filters are also available, but these generally comprise a ceramic or metallic container filled with loose, activated particles. Such loose bed filters have the disadvantages of (1) a tendency to develop channels, (2) attrition between individual particles which causes powdering and packing with a resultant change in the penetrability of the unit and also a lessening of desiccant properties, and (3) formation of strata in the bed due to classification which occurs during use.

It is, therefore, a primary object of this invention to provide a ceramic filter body in which the above disadvantages of loose bed filters are overcome, and which may be used to remove both solids and moisture from liquids or gases passing through it.

Another object of this invention is to provide a method of fabricating a highly porous ceramic filter body having both adsorbent and absorbent properties.

A further object of the invention is to provide a ceramic filter body, capable of removing fine solid particles from a gas or liquid being filtered, which will permanently retain its pore size and shape.

In accordance with the present invention these and other objects are achieved by means of a composite filter body comprising particles of an adsorbent selected from the group consisting of activated alumina, molecular sieves and mixtures thereof bonded by a ceramic flux material. The bodies preferably contain at least 50% by weight adsorbent and the particle size of the adsorbent particles will normally range from 14 to 60 mesh.

The invention further includes a method for making ceramic filter bodies which comprises mixing molecular sieve, activated alumina or mixtures thereof with a ceramic flux material and firing the mixture at a temperature sufficient to fuse the flux material to the particles of adsorbent, but insufficient to substantially decrease the adsorption power of the adsorbent.

The term "activated alumina" as used herein means a material consisting essentially of aluminum oxide and a small amount of combined water and characterized by its desiccant properties. Activated aluminas which are suitable for use in the present invention may contain some impurities. Examples of specific aluminas are the so-called H and F grade activated aluminas. H grade alumina contains a small amount of silica. A typical sample of H grade alumina, e.g. H–151, would consist of (by weight) 85% $Al_2O_3$, 2.0% $Na_2O$, 0.15% $Fe_2O_3$, 6.3% $SiO_2$, and 6.2% of material lost on ignition which is substantially all water. On the other hand F grade activated alumina as used herein is substantially all $Al_2O_3$ and combined water. A typical sample, e.g. F–1, might consist of 92% $Al_2O_3$, 0.80% $Na_2O$, 0.12% $Fe_2O_3$, 0.09% $SiO_2$, and 6.8% of material lost on ignition which is substantially all water.

Activated alumina is prepared by a controlled heating of aluminum hydrate $[Al(OH)_3]$. In heating the hydrate the major portion of chemically combined water is driven off, and if the proper temperature is used, the resultant calcine has the ability to adsorb water from the ambient atmosphere, i.e. it becomes "activated." However, too high a calcination temperature destroys the adsorptive activity of the hydrate so that there is an optimum activation temperature at which the greatest activity results. The exact optimum temperature varies somewhat with the grade of aluminum hydrate employed. For example, the preferred temperature for F grade aluminum hydate is in the range of 750° to 775° F., whereas the optimum temperature for H grade aluminum hydrate is about 850° F. While ordinarily any temperature in excess of these temperatures would be avoided, it is possible to heat the hydrate considerably above these temperatures without seriously reducing the activity of the alumina. In fact it has been found that firing temperatures as high as 2,000° F., may be used without effectively destroying the desiccant properties of the alumina. Temperatures in excess of 2,000° F., on the other hand, seriously reduce or sompletely destroy the activity of, or "dead-burn," the alumina.

In preparing bodies according to the invention, it is possible to use aluminum hydrate in the raw mix and to rely upon the firing of the body to activate the hydrate. Thus, for example, in place of using F–1 alumina it is possible to use the corresponding hydrate, referred to as C–40 hydrate. F–1 is obtained by heating C–40 at 800° F. However, it is preferred to use an activated alumina in the initial mixture.

In place of activated alumina, bodies according to the invention may use a molecular sieve as the adsorbent. Molecular sieves are alkali metal and alkaline earth metal zeolites or aluminosilicates which in the dehydrated condition maintain a crystal structure which affords a network of pores and cavities amounting to about 50% of the total crystal volume.

Typical molecular sieve compositions are illustrated by the following, which are manufactured by the Linde Company, a division of Union Carbide Corporation:

Type 4A: $0.96 \pm 0.04 Na_2O \cdot 1.00 Al_2O_3 \cdot 1.92$
$\pm 0.09 SiO_2 \cdot xH_2O$
Type 5A: $0.72 \pm 0.03 CaO \cdot 0.24$
$\pm 0.01 Na_2O \cdot 1.00 Al_2O_3 \cdot 1.92 \pm 0.09 SiO_2 \cdot xH_2O$
Type 13X: $0.83 \pm 0.05 Na_2O \cdot 1.00 Al_2O_3 \cdot 2.48$
$\pm 0.03 SiO_2 \cdot xH_2O$ "$x$" will of course vary with the degree of hydration of the sieve at any time. By activating the material at high temperature in a stream of very dry gas, $x$ can be reduced to zero.

Obviously other types of molecular sieves than those cited may be used as desired.

Molecular sieves have the advantage over other adsorbents such as activated alumina in being able to remove fluid contaminants when such contaminants appear in very small concentrations. They are, however, much more expensive than activated alumina and for this reason it is often desirable to use mixtures of the two.

In preparing bodies according to the invention a raw mix comprising an adsorbent (or potential adsorbent) selected from the group consisting of activated alumina, aluminum hydrate, molecular sieves and mixtures thereof together with a ceramic flux and, if desired, a binder and a vehicle, is shaped and fired. The firing temperature is generally below 2000° F. and usually in the range 900° F.–2000° F. In this connection it may be pointed out that molecular sieves are activated at 300–660° F. and adversely affected by temperatures in excess of say 1100° F., so that when a molecular sieve is a component of the mixture, temperatures in the lower part of the range are indicated. However, temperatures as high as possible are preferably used since higher temperatures generally permit the use of fluxes or frits which will form a stronger bond with the adsorbent, and provide more uniform penetration factors. The "penetration factor" is a measure of the ability of the filtrate to pass through the filter body.

The flux or glass frit used in the present invention may be chosen from any of the large number of such materials well-known to the art having a maturing temperature between the activation temperature of the adsorbent and the temperature at which the adsorbent becomes "dead-burned." Normally the flux or frit will have a maturing temperature of say 850° F. to 2,000° F. and will, at that temperature, provide a good ceramic bond with alumina.

Glasses or fluxes having these properties are readily compounded by those skilled in the art from mixtures of silica ($SiO_2$) and various combinations of the oxides of aluminum ($Al_2O_3$), boron ($B_2O_3$), sodium ($Na_2O$), potassium ($K_2O$), Lithium ($Li_2O$), calcium ($CaO$), magnesium ($MgO$), Barium ($BaO$), lead ($PbO$), and zinc ($ZnO$), among other elements. Some suitable fluxes are listed in Table I below:

TABLE I

*Flux compositions*

|  | A | B | C | D | E | F |
|---|---|---|---|---|---|---|
| $SiO_2$ | 20.0 | 24.9 | 13.4 | 11.9 | 34.0 | 56.3 |
| $Na_2O$ | 6.4 | 1.5 |  |  |  | 14.9 |
| PbO | 59.2 | 71.2 | 72.2 | 88.1 | 65.0 |  |
| $Al_2O_3$ |  | 2.4 |  |  | 1.0 |  |
| $B_2O_3$ | 14.4 |  | 9.0 |  |  | 21.6 |
| ZnO |  |  | 5.4 |  |  |  |
| CaO |  |  |  |  |  | 7.2 |
| Melting point, °F.* | 1,040 | 1,300 | 1,050 | 1,390 | 1,450 | 1,500 |

*The temperature given is the melting point. However, the fluxes illustrated generally soften and become tacky at considerably lower temperatures. Thus composition "A" can be used at 900° F. to give a satisfactory bond.

Generally, the amount of flux used in the practice of the invention will be from about 5 parts to about 30 parts per 100 parts of adsorbent.

For proportioning purposes, where alumina is added as the hydrate, the weight is calculated as $Al_2O_3$.

In manufacturing bodies according to the invention, the adsorbent may simply be mixed with the flux or frit, shaped and fired at a temperature sufficient to mature the frit. A small amount of vehicle, such as water, may be used to give the raw unfired mix cohesiveness for shaping.

Preferably, however, because unfired agglomerates of glass frit particles and adsorbents do not easily adhere together by themselves, a binder is provided which will enable the agglomerate to be molded into a body having the desired dimensions.

In choosing such a binder, it is important to select one which is effective in comparatively small concentrations because of the reduction in activity of the final product due to the presence of relatively inactive binding material. For this reason, I prefer to use the colloidal clay-like material known as bentonite. This material gives excellent results when present in an amount of one part of bentonite to 10 parts of activated adsorbent. Other binders may be used such as other clay material, or plastic colloidal materials such as the product sold on the market under the name "Veegum" produced by the R. T. Vanderbilt Co., or Eyrite, a mineral comprising chiefly calcium carbonate and magnesium silicate. It is contemplated that still other binders, organic or inorganic may be used. However, normally the materials used are those which are effective in concentrations of not more than one part binder to 10 parts adsorbent. Preferably the proportion of binder will be from 5 to 15 parts by weight per 100 parts of adsorbent. In addition to the solid binder material, a liquid vehicle is generally added. When bentonite is the binder, water is the preferred vehicle, and is preferably used in concentrations of from 10 to 20 per 100 parts by weight of adsorbent.

The use of a binder is also advantageous in permitting relatively low molding pressures to be used. Low molding pressures are in general preferred over higher pressures, because when higher pressures are used the body becomes more dense and compacted, thereby reducing the porosity, filtering rate and filtering capacity of the filter body. In general, the density of the finished filter body should be less than about 2.1 g./cc. Uusually the blocks have a density of say 1–2 g./cc.

When all of the ingredients have been mixed together, i.e. the adsorbent, the flux or glass frit, and binder, the mass may be molded into the desired shape by die-pressing in conventional dies. The preferred die-pressing procedure in the practice of this invention is a flexible die-pressing process known as "iso-static molding." This process is described in detail in the Benjamin A. Jeffrey Patents No. 1,863,854 dated June 21, 1932, Re. 20,460 dated August 1937 and No. 2,251,454, dated August 5, 1941. This molding process has the advantage of providing porosity and avoids the surface packing common to steel die pressing.

In general, the required mold pressures are 200 p.s.i. or above. In general, at pressures below 200 p.s.i. the parts are too soft and difficult to handle. On the other hand, when the mold pressure exceeds 4,000 p.s.i., the density is so great that the filter flow rate is cut too much. Preferably, the mold pressure should be between about 200 p.s.i. and about 2,000 p.s.i.

After the filter body has been molded, it is fired at a temperature sufficient to fuse the flux or glass frit and provide a ceramic bond between the particles of alumina. This provides a strong composite body which has all the advantages of a porous filter in addition to desiccant properties.

Firing time is not critical and will be whatever is required to effect maturing of the particular frit employed. In conducting the firing the body is normally brought up to temperature as rapidly as the size and dimensions of the body and of the furnace will permit. This may be, for example, on the order of ½ to 5 hours. The body is held at temperature (soaked) for a period of 10 minutes or greater, and periods as long as 24 hours have given good results. After maturing, the body is left to cool gradually over a period of say 2 to 24 hours.

In the following examples the samples were brought up to the temperature indicated in about 50 minutes and retained at temperature for about 10 minutes. The samples were then allowed to cool gradually so that if, for example, the firing temperature were 1400° F., after 10 minutes the bodies would be at about 1200° F., after 20 minutes at about 1060° F., after 30 minutes at about 950° F., after 1 hour at about 700° F., and after 2 hours at about 440° F. However, it should be understood that any heating cycle which will mature the frit employed may be used.

The invention will be further described with reference to the following specific examples, it being understood that these examples are given for the purpose of illustration only and are not to be taken as in any way limiting the invention beyond the scope of the appended claims.

EXAMPLE 1

One hundred parts by weight of C–40 aluminum hydrate having a particle size of 28 to 48 mesh and 13 parts by weight of flux (No. 8 Drakenfeld 100 mesh, maturing at about 1200° F.) were tumbled for 15 minutes. Then 10 parts by weight of powdered Wyoming bentonite was added and this mixture was tumbled for 15 minutes. Fourteen parts by weight of water was then added and the material mixed for five minutes in a standard muller-type blender. The finished grain was then pressed into shape in ceramic dies at 2,000 p.s.i. Specimens were then fired at 1300° F., 1400° F. and 1500° F. The filter bodies were then tested in atmospheres at 100° relative humidity for adsorption. It was found that after four days the specimen fired at 1300° F. had adsorbed 17.7% moisture, the specimen at 1400° F. had adsorbed 17.6% and the specimen fired at 1500° F. had adsorbed 17.0% moisture. The total sorption was 37.4%, 38.5% and 39.0% for the specimens fired at 1300° F., 1400° F. and 1500° F. respectively. This illustrated that these firing temperatures are not too high to provide an activated filter body. In addition, a good ceramic bond was achieved during firing.

EXAMPLE 2

The procedure in Example 1 was repeated except that 20 parts by weight of flux and 14.5 parts by weight of water were used.

EXAMPLE 3

The procedure of Example 1 was followed except that 25 parts by weight of flux and 15 parts by weight of water were used.

EXAMPLE 4

The procedure of Example 1 was repeated except that Flux "A" (100 mesh) was used in an amount of 15 parts by weight.

The results of variation in flux content are tabulated in Table II below, in which the flux concentrations of 15, 20 and 25 parts per 100 parts C-40 aluminum hydrate of Examples 4, 2 and 3 respectively are shown.

TABLE II

*Percent adsorbed moisture*

|       | Time in days at 100% relative humidity |      |      |       | Total sorption | Flux parts per 100 parts Al-hydrate |
|-------|------|------|------|-------|-------|-------|
|       | 1    | 1.8  | 2.7  | 4.65  |       |       |
| Ex. 4 | 10.2 | 13.6 | 15.6 | 17.4  | 37.3  | 15    |
| Ex. 2 | 9.0  | 12.0 | 14.2 | 16.2  | 33.1  | 20    |
| Ex. 3 | 7.2  | 10.8 | 13.1 | 15.1  | 28.5  | 25    |

Table II graphically illustrates the fact that increasing the amount of flux decreases the adsorption characteristics of the activated alumina and, therefore, it is desirable to use low flux concentrations. On the other hand, if the flux concentration is too low, an insufficient ceramic bond results and the filter body may not have the desired strength. The table also illustrates that the flux increase from 20 to 25% cuts down the adsorption characteristics a greater amount than the increase from 15 to 20%. It appears that lower concentrations of flux have no adverse effect on the activity of the alumina, and that in such amounts the reduction in activity is only that which would be expected because of a higher concentration of inactive particles.

EXAMPLE 5

The procedure of Example 4 was repeated except that different specimens were fired at 1100° F. and 1200° F., respectively, to determine the effect of the firing temperature on the adsorption characteristics of the filter body. It was found that such temperatures provided good desiccant properties with the adsorption after five days exposure at 100% humidity being 19.1% for the body fired at 1100° F. and 18.9% for the body fired at 1200° F.

EXAMPLE 6

The procedure of Example 4 was repeated except that 30–60 mesh F–1 activated alumina was used instead of C–40 aluminum hydrate and specimens were fired at temperatures of from 1400° F. to 2000° F. The adsorption characteristics of the filter body of this example are shown in Table III below.

TABLE III

*Effect of firing temperature on adsorption*

| Firing temperature | Time in days at 100% relative humidity |      |      |      |      |
|-------|------|------|------|------|------|
|       | 1    | 2.7  | 4    | 5    | 7    |
| 1,400 | 16.5 | 24.2 | 25.5 | 25.9 | 26.5 |
| 1,500 | 13.2 | 21.3 | 23.5 | 23.6 | 24.6 |
| 1,600 | 10.2 | 18.6 | 21.2 | 21.6 | 22.7 |
| 1,700 | 9.9  | 17.3 | 20.3 | 21.2 | 22.2 |
| 1,800 | 9.2  | 14.6 | 17   | 17.3 | 18.1 |
| 1,900 | 5.6  | 9.8  | 12.9 | 13.2 | 14.2 |
| 2,000 | 3.0  | 4.9  | 5.5  | 5.7  | 6.1  |

Table III indicates that the use of higher firing temperatures reduces the activity of the alumina in the final filter body and, as has been stated, the activity above 2000° F. is small and it is preferred to avoid firing at temperatures above this value. Example 5 shows that temperatures on the order of 1000° F. may be used with satisfactory results.

EXAMPLE 7

The procedure of Example 4 was repeated except that 30–60 mesh H–151 activated alumina was used instead of C–40 aluminum hydrate. The adsorption characteristics of Examples 4, 6 and 7, in which three different types of alumina were used, and in which the firing temperature was 1400° F., were tabulated and the results are set forth in Table IV.

TABLE IV

*Effect of type of alumina on adsorption*

|       | Time in days at 100% relative humidity |      |      |      |      | Total Sorption |
|-------|------|------|------|------|------|------|
|       | 1.2  | 1.9  | 3.25 | 6.1  | 8    |      |
| Ex. 4: |     |      |      |      |      |      |
| Run No. 1 | 11.7 | 13.2 | 15.5 | 17.9 |      | 35.8 |
| Run No. 2 | 10.0 | 12.9 | 15.1 | 17.0 | 17.7 | 36.8 |
| Ex. 6 | 18.0 | 21.8 | 25.0 | 26.3 |      | 44.8 |
| Ex. 7: |     |      |      |      |      |      |
| Run No. 1 | 16.4 | 21.7 | 23.5 | 26.9 | 27.9 | 42.6 |
| Run No. 2 | 15.1 | 19.9 | 22.9 | 25.9 | 27.8 | 41.9 |

In Table IV above, it is seen that the alumina used in Examples 6 and 7 was more effective than the hydrate used in Example 4, and this demonstrates the fact that it is preferable to use activated alumina from the beginning rather than to use an aluminum hydrate and depend upon the firing step to provide activation thereof. However, it is seen that the aluminum hydrate does become activated and it is within the ambit of this invention to use such materials.

EXAMPLE 8

One hundred parts by weight of F–1 activated alumina having a particle size of 14–28 mesh were tumbled with 15 parts by weight of flux "A." Then 10 parts by weight of powdered Wyoming bentonite was added and this mixture was tumbled for 15 minutes. Twenty parts by weight of water was then added and the mixture mixed for five minutes in a standard Muller-type blender. The finished grain was then pressed into shape in ceramic dies at various pressures. One group of specimens was pressed with a mold pressure of 200 p.s.i., a second group at a mold pressure of 500 p.s.i., and a third group at a mold pressure of 1,000 p.s.i. All of the specimens were then fired at 1400° F., and the resultant filter bodies were tested for filter time to determine the effect of the mold pressure. The filtering rate in gallons per minute with various head pressures is shown below in Table V.

TABLE V

*Filtering rate in gallons per minute*

| Head pressure, p.s.i. | Mold pressure, p.s.i., used in molding filter body | | |
|---|---|---|---|
| | 200 | 500 | 1,000 |
| 1 | .83 | .31 | .11 |
| 2 | 1.43 | .64 | .19 |
| 3 | 1.92 | 1.00 | .33 |
| 4 | 2.34 | 1.28 | .53 |
| 5 | 2.72 | 1.42 | .71 |

It will be seen from Example 8 and Table V that the mold pressure has a considerable effect on the resultant filtering rate of the filter body. Accordingly, it is desirable to utilize a mold pressure which is only high enough to provide sufficient adherence prior to the firing step.

EXAMPLE 9

One hundred parts by weight of C–40 aluminum hydrate having a particle size of 20–48 mesh and 15 parts by weight of flux having a particle size of 100 mesh are tumbled and a small amount of moisture is added. The material is pressed in an open stainless steel pan and fired at 1400° F. The resulting mass is then removed from the pan and there is provided a composite porous body having desiccant properties.

EXAMPLE 10

Twenty-five parts by weight of molecular sieve pellets (Linde type 4A 1/16″) were crushed and sieved through 14 on 50 mesh. To this was added 75 parts of F–1 activated alumina, through 14 on 28 mesh and 15 parts flux A. The mixture was milled in a ball mill for 15 minutes and then 10 parts of powdered bentonite were added. After an additional 15 minutes of milling sufficient water to give a pressable paste was added and test specimens in the form of discs 1.13″ diameter, ½″ thick were made in an hydraulic press, at 600 p.s.i. They were then fired at 900° F., 1100° F., and 1400° F.

The samples fired at 900° F. and 1100° F. had good absorbent qualities under conditions of both high (100%) humidity and low (3.2%) humidity.

EXAMPLE 11

Five hundred (500) grams of molecular sieve (Linde type 4A) through 30 mesh on 50 mesh were mixed with 100 ml. of water and ball milled for 5 minutes. Seventy-five (75) grams of flux "A" and 50 grams of powdered bentonite were separately milled, dry, for 5 minutes. The two mixtures were combined, 50 ml. of water were added and the combined mixture was milled for another 5 minutes.

Sample discs were pressed at 600 p.s.i. in a steel die and fired at 900° F., 1100° F. and 1400° F. with a 15 minute soak at firing temperature. The finished bodies were then tested for adsorption in air at 3.2% and 100% relative humidity (∼68° F.). The figures given below for water absorption are in percent by weight of the dry body after 30 days.

TABLE VI

| Firing temperature, ° F. | Water adsorbed | |
|---|---|---|
| | 100% rel. humidity | 3.2% rel. humidity |
| 900 | 14 | 2.6 |
| 1,100 | 13.8 | 2.4 |
| 1,400 | 6.8 | 1.6 |

I claim:

1. A composite adsorbent filter body consisting essentially of at least 50% by weight of particles of an adsorbent material selected from the group consisting of crystalline zeolite molecular sieves, activated alumina and mixtures thereof, the particles of said adsorbent material being fused together by between about 5 and about 30 parts by weight, per 100 parts of adsorbent material of a glass frit having a maturing temperature between 850° F. and 2000° F.

2. A composite adsorbent filter body consisting essentially of at least 50% by weight of particles of an adsorbent material selected from the group consisting of crystalline zeolite molecular sieves, activated alumina and mixtures thereof, and between about 5 and about 15 parts by weight of a clay binder; the balance of said body consisting of a glass frit having a maturing temperature between 850° F. and 2000° F., said frit fusing together the particles of said adsorbent material and there being at least 5 parts by weight of said frit, per 100 parts of adsorbent.

3. The filter body claimed in claim 1 wherein the size of the absorbent is between about 14 and about 60 mesh.

4. The filter body claimed in claim 1 wherein the adsorbent is activated alumina.

5. The filter body claimed in claim 1 wherein the adsorbent is a crystalline zeolite molecular sieve.

6. The filter body claimed in claim 2 wherein the clay binder is bentonite.

7. A method for preparing a desiccant filter body which comprises intimately mixing particles of an adsorbent selected from the group consisting of activated alumina, crystalline zeolite molecular sieves and mixtures thereof, a clay binder, and a glass frit having a maturing temperature between 850 and 2000° F., molding the mixture into a shaped mass, and subjecting the shaped mass to a temperature below that required to dead-burn the adsorbent and sufficient to fuse the glass frit to the adsorbent particles and produce a composite article consisting essentially of at least 50% adsorbent, from 5 to 15 parts of clay binder per 100 parts of adsorbent, and the balance glass frit, there being at least 5 parts of said glass frit per 100 parts of adsorbent, said glass frit bonding the particles of adsorbent together.

8. A method of preparing an adsorbent filter body which comprises intimately mixing particles of aluminum hydrate and a glass frit material having a maturing temperature between 850 and 2000° F., and heating the mixture at a temperature below that required to dead-burn alumina, to activate the alumina and to fuse the glass frit to the particles of alumina, thus to produce a composite article, consisting essentially of activated alumina particles bonded by a glass frit material, activated alumina comprising at least 50% by weight of the filter body, and there being between about 5 and about 30 parts by weight of said glass frit, per 100 parts of said alumina, in said body.

9. A method of preparing a desiccant filter body which comprises intimately mixing particles of an adsorbent selected from the group consisting of activated alumina, crystalline zeolite molecular sieves and mixtures thereof and a glass frit material having a maturing temperature between 850 and 2000° F., and subjecting the mixture to a temperature sufficient to fuse the glass frit to the particles of adsorbent and produce a composite article, said temperature being below that required to dead-burn said adsorbent, said adsorbent comprising at least 50% by weight of said body and there being between about 5 and about 30 parts by weight of glass frit per 100 parts of adsorbent in said body.

10. The method claimed in claim 9 wherein the adsorbent is activated alumina.

11. The method claimed in claim 9 wherein the adsorbent is a crystalline zeolite molecular sieve.

12. The method claimed in claim 9 wherein the binder is bentonite.

13. A method of preparing a desiccant ceramic filter body which comprises mixing about 100 parts by weight of an adsorbent selected from the group consisting of activated alumina, crystalline zeolite molecular sieves and mixtures thereof with about 5 to about 30 parts by weight of a glass frit material maturing between about 850 and 2000° F., then adding a clay binder to the mixture, then adding water and mixing thoroughly to provide homogeneity, pressing the final mixture in dies by an isostatic molding process at a pressure from about 200 p.s.i. to about 4,000 p.s.i., and firing the pressed body at a temperature of from 850° F. to about 2000° F. to fuse the glass frit and provide a composite unit having particles of adsorbent material bonded by a glass frit, said adsorbent comprising at least 50% by weight of said body.

14. A method of preparing a desiccant ceramic filter body which comprises mixing about 100 parts by weight of an adsorbent selected from the group consisting of activated alumina, crystalline zeolite molecular sieves and mixtures thereof with about 5 to 30 parts by weight of a glass frit material having a maturing temperature between 850 and 2000° F., then adding about 5 to 15 parts by weight of clay binder to the mixture, then adding water and blending the mixture to provide homogeneity, pressing the final mixture in dies by an isostatic molding process at a pressure from about 200 p.s.i. to 4,000 p.s.i., and firing the pressed body at a temperature of from about 850° F. to about 2000° F. to fuse the glass frit and provide a composite unit having adsorbent particles bonded by a glass frit, said adsorbent particles comprising at least 50% by weight of said body.

15. A method of preparing a desiccant ceramic filter body which comprises mixing about 100 parts by weight of an adsorbent selected from the group consisting of activated alumina, crystalline zeolite molecular sieves and mixtures thereof, with about 5 to about 30 parts by weight of a glass frit material having a maturing temperature betwen 850 and 2000° F., then adding a clay binder to the mixture, then adding water in an amount to provide about 5 to about 25% water and blending the mixture to provide homogeneity, pressing the final mixture in dies by an isostatic molding process at a pressure of from about 200 p.s.i. to 4,000 p.s.i., and firing the pressed body at a temperature of from about 850° F. to about 2,000° F. to fuse the glass frit and provide a composite unit, having adsorbent particles bonded by a glass frit, said adsorbent particles comprising at least 50% by weight of the body.

16. A method of preparing a desiccant ceramic filter body which comprises mixing about 100 parts by weight of an adsorbent selected from the group consisting of activated alumina, crystalline zeolite molecular sieves and mixtures thereof, with about 5 to about 30 parts by weight of a glass frit material having a maturing temperature between 850 and 2000° F., then adding about 5 to about 15 parts by weight of a clay binder to the mixture, then adding water in an amount to provide from about 5 to 25% of water and blending the mixture to provide homogeneity, pressing the final mixture in dies by an isostatic molding process at a pressure of from about 200 p.s.i. to 4,000 p.s.i., and firing the pressed body at a temperature of from about 1000° F. to about 2000° F. to fuse the glass frit and provide a composite unit having adsorbent particles bonded by a glass frit, said adsorbent particles comprising at least 50% by weight of said body.

17. The method for preparing a desiccant ceramic filter body defined in claim 16 in which the adsorbent is activated alumina.

18. The method for preparing a desiccant ceramic filter body defined in claim 16 in which the adsorbent is a crystalline zeolite molecular sieve.

19. The method of preparing a desiccant ceramic filter body defined in claim 16, in which the clay binder is bentonite.

References Cited by the Examiner

UNITED STATES PATENTS

| | | | |
|---|---|---|---|
| Re. 23,009 | 6/1948 | Camp | 210—500 XR |
| 2,283,174 | 5/1942 | Bates | 210—502 XR |
| 2,469,512 | 5/1949 | Naugle | 210—502 |
| 2,865,867 | 12/1958 | Van Dyke | 252—455 |
| 2,962,435 | 11/1960 | Fleck | 452—455 XR |
| 2,973,327 | 2/1961 | Mitchell | 252—449 |

OTHER REFERENCES

"Porous Media," The Carborundum Co., Form 5118, Oct. 27, 1950, pages 6, 9 and 13.

"General Information on Linde Molecular Sieves," July 1956, Form 8605 A; 8 pages, Linde Air Products Co., Division of Union Carbide and Carbon Corporation.

JULIUS GREENWALD, *Primary Examiner.*

CARL F. KRAFT, ALEXANDER WYMAN, *Examiners.*

UNITED STATES PATENT OFFICE
CERTIFICATE OF CORRECTION

Patent No. 3,235,089　　　　　　　　　　　　　　February 15, 1966

Francis H. Burroughs

It is hereby certified that error appears in the above numbered patent requiring correction and that the said Letters Patent should read as corrected below.

Column 2, line 27, for "sompletely" read -- completely --; column 4, line 17, for "Uusually" read -- Usually --; column 7, line 42, for "absorbent" read -- adsorbent --; column 10, after line 36, insert -- 3,025,233  3/1962  Figert--210-502 --.

Signed and sealed this 23rd day of May 1967.

(SEAL)
Attest:

EDWARD M. FLETCHER, JR.　　　　　　　　　EDWARD J. BRENNER
Attesting Officer　　　　　　　　　　　　　　Commissioner of Patents